(12) United States Patent
Lee

(10) Patent No.: US 9,690,074 B2
(45) Date of Patent: Jun. 27, 2017

(54) IMAGING LENS AND CAMERA MODULE

(75) Inventor: Kyunghwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/232,527

(22) PCT Filed: Jul. 2, 2012

(86) PCT No.: PCT/KR2012/005235
§ 371 (c)(1),
(2), (4) Date: Jan. 13, 2014

(87) PCT Pub. No.: WO2013/009023
PCT Pub. Date: Jan. 17, 2013

(65) Prior Publication Data
US 2014/0139936 A1 May 22, 2014

(30) Foreign Application Priority Data

Jul. 13, 2011 (KR) .................. 10-2011-0069333
Jun. 27, 2012 (KR) .................. 10-2012-0069240

(51) Int. Cl.
*G02B 9/60* (2006.01)
*G02B 13/00* (2006.01)

(52) U.S. Cl.
CPC .............. *G02B 13/0045* (2013.01)

(58) Field of Classification Search
CPC ........ G02B 9/60; G02B 13/0045; G02B 13/18
USPC .................................. 359/764, 708
See application file for complete search history.

(56) References Cited

U.S. PATENT DOCUMENTS 7,710,665 B2 * 5/2010 Park et al. ............... 359/767
2010/0220229 A1 * 9/2010 Sano ..................... 348/340

FOREIGN PATENT DOCUMENTS

| CN | 101782676 A | 7/2010 |
| CN | 101819315 A | 9/2010 |
| JP | 2010-197665 A | 9/2010 |
| JP | 2010-224521 A | 10/2010 |
| TW | 200819901 A | 5/2008 |
| TW | 200918981 A | 5/2009 |
| TW | M369459 U | 11/2009 |
| TW | M369460 U | 11/2009 |

(Continued)

OTHER PUBLICATIONS

Office Action dated Apr. 2, 2014 in Taiwanese Application No. 101123869.

(Continued)

*Primary Examiner* — James Greece
(74) *Attorney, Agent, or Firm* — Saliwanchik, Lloyd & Eisenschenk

(57) ABSTRACT

According to exemplary embodiments of the present invention, an imaging lens includes in an ordered way from an object side, a first lens movable and having positive (+) refractive power, a second lens having negative (−) refractive power, a third lens having positive (+) refractive power, a fourth lens having positive (+) refractive power, and a fifth lens having negative (−) refractive power, wherein, a conditional expression of $0.5 < f1/fz1$, $f1/fz2$, $f1/fz3 < 1.5$ is satisfied, where focus distances of imaging lens are respectively $fz1$, $fz2$ and $fz3$, and a focus distance of the first lens is $f1$ at zoom positions 1, 2 and 3.

22 Claims, 8 Drawing Sheets

(56) References Cited

FOREIGN PATENT DOCUMENTS

TW    2010-38966 A    11/2010
TW     201102690 A     1/2011

OTHER PUBLICATIONS

Office Action dated Mar. 25, 2016 in Taiwanese Application No. 104122487.
Office Action dated Aug. 28, 2015 in Chinese Application No. 201280034560.8.
Office Action dated Dec. 7, 2016 in Taiwanese Application No. 10521508120.

* cited by examiner

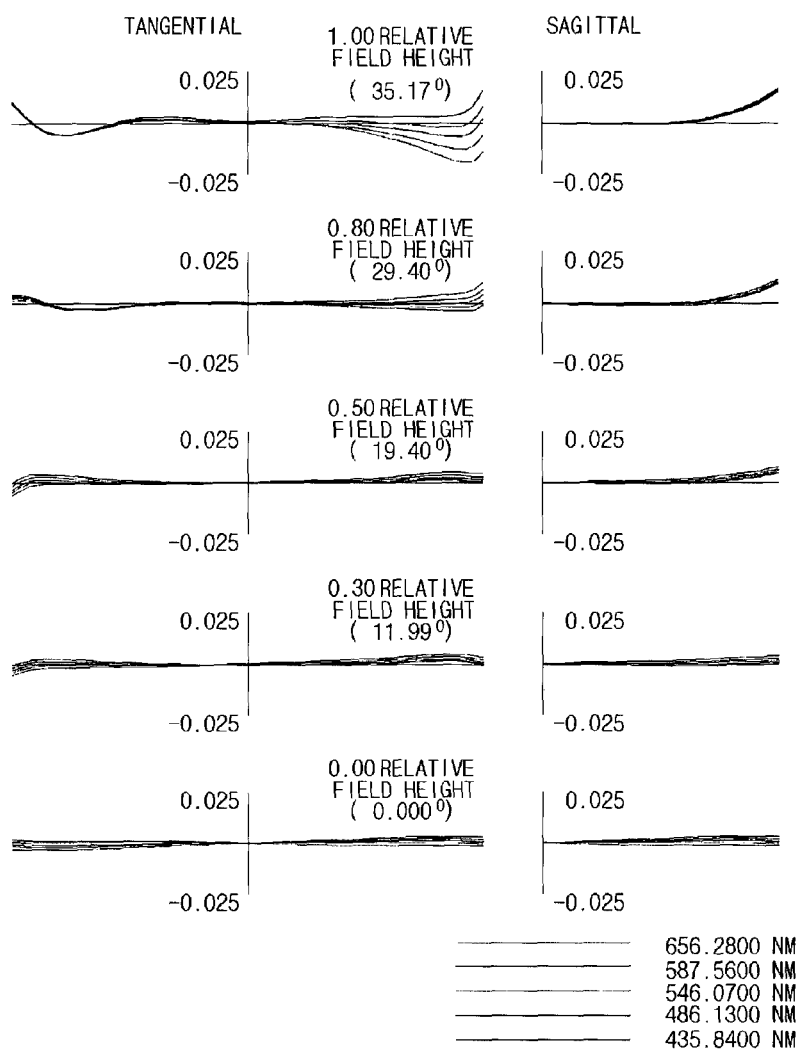

IMAGING LENS AND CAMERA MODULE

CROSS-REFERENCE TO RELATED APPLICATIONS

This application is the U.S. national stage application of International Patent Application No. PCT/KR2012/005235, filed Jul. 2, 2012, which claims priority to Korean Application Nos. 10-2012-0069240, filed Jun. 27, 2012, and 10-2011-0069333, filed Jul. 13, 2011, the disclosures of each of which are incorporated herein by reference in their entirety.

TECHNICAL FIELD

The teachings in accordance with exemplary embodiments of this invention relate generally to an imaging lens and a camera module.

BACKGROUND ART

Recently, vigorous research efforts are being made in the field of a mobile phone-purpose camera module, a digital still camera (DSC), a camcorder, and a PC camera (an imaging device attached to a person computer) all connected with an image pickup system. One of the most important components in order that a camera module related to such an image pickup system obtains an image is an imaging lens producing an image.

Previously, there have been attempts to construct an imaging lens of high-resolution by using 5 pieces of lenses. Each of 5 pieces of lenses is comprised of lenses with a positive (+) refractive power and lenses with a negative (−) refractive power. However, an imaging module of such a framework fails to show approving optic characteristics or aberration characteristics. Accordingly, a high-resolution imaging lens of a new power structure is required.

DISCLOSURE OF INVENTION

Technical Problem

Accordingly, embodiments of the present invention may relate to an imaging lens and a camera module that substantially obviates one or more of the above disadvantages/problems due to limitations and disadvantages of related art, and it is an object of the present invention to provide an imaging lens and a camera module.

Technical problems to be solved by the present invention are not restricted to the above-mentioned, and any other technical problems not mentioned so far will be clearly appreciated from the following description by skilled in the art.

Solution to Problem

An imaging lens according to one exemplary embodiment of the present invention is comprising in an ordered way from an object side: a first lens movable and having positive (+) refractive power; a second lens having negative (−) refractive power; a third lens having positive (+) refractive power; a fourth lens having positive (+) refractive power; a fifth lens having negative (−) refractive power, wherein, in a case Abbe's numbers of first, second, third, fourth and fifth lenses are respectively V1, V2, V3, V4 and V5, conditional expressions of 20<V2, V3<30, and 50<V1, V4, V5<60 are satisfied.

Preferably, but not necessarily, a conditional expression of 0.1<d1<0.4, 1.15<d3<0.54 is satisfied, where d1 is an air clearance between a first lens center and a second lens center at a zoom position 1, and d3 is an air clearance between the first lens center and the second lens center at a zoom position 3.

Preferably, but not necessarily, a conditional expression of 4.7<$\Sigma T$<5.9, 0.5<$\Sigma T/fz1$, $\Sigma T/fz2$, $\Sigma T/fz3$<1.5 is satisfied, where a distance from an object side surface of the first lens to an image-forming surface is $\Sigma T$.

Preferably, but not necessarily, conditional expressions of 1.6<N2, N3<1.7, and 1.5<N1, N4, N5<1.6 are satisfied, where refractive indexes of the first, second, third, fourth and fifth lenses are respectively N1, N2, N3, N4 and N5.

Preferably, but not necessarily, a conditional expression of 0.5<f1/fz1, f1/fz2, f1/fz3<1.5 is satisfied, where focus distances of imaging lens are respectively fz1, fz2 and fz3, and a focus distance of the first lens is f1 at zoom positions 1, 2 and 3.

Preferably, but not necessarily, a conditional expression of 2.0<F/#<3.0 is satisfied, where the f number is F/#.

Preferably, but not necessarily, the first lens takes a convex form at an object side surface.

Preferably, but not necessarily, the second lens takes a concave form at an upper side surface.

Preferably, but not necessarily, the third lens takes a meniscus form convexly formed at an object side surface.

Preferably, but not necessarily, the fourth lens takes a meniscus form.

Preferably, but not necessarily, all surfaces of the third, fourth and fifth lenses have at least one or more inflection points.

A camera module according to one exemplary embodiment of the present invention is comprising: an actuator mounted with a first lens and moving the first lens during auto focusing; and a lens barrel mounted with second, third, fourth and fifth lenses, where the first lens has positive (+) refractive power, the second lens has negative (−) refractive power, the third lens has positive (+) refractive power, the fourth lens having positive (+) refractive power, and the fifth lens has negative (−) refractive power.

Preferably, but not necessarily, the camera module is further comprising a holder fixing the lens barrel.

Advantageous Effects of Invention

The imaging lens and camera module according to the present invention have advantageous effects in that a compact and high-resolution imaging lens system can be configured by moving one piece, i.e., a first lens, out of five imaging lenses.

BRIEF DESCRIPTION OF DRAWINGS

FIGS. 4a, 4b and 4c are graphs illustrating measured coma aberrations at first, second and third zoom positions according to an exemplary embodiment of the present invention.

BEST MODE FOR CARRYING OUT THE INVENTION

Figure 1:
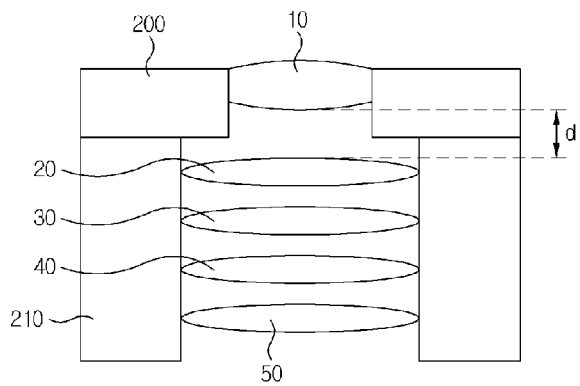
FIG. 1 is a mimetic cross-sectional view illustrating configuration of a camera module according to an exemplary embodiment of the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thus," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the imaging lens and camera module according to exemplary embodiments of the present invention will be described in detail with reference to the accompanying drawings.

Figure 2:
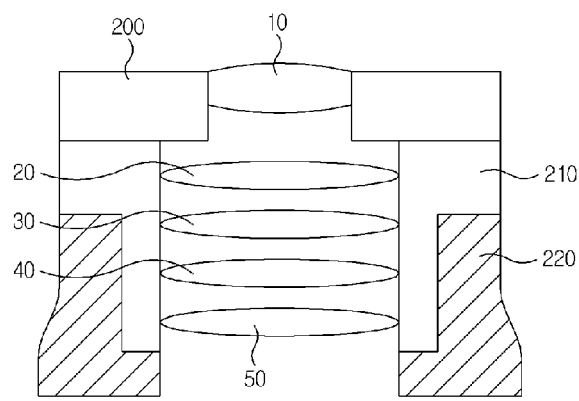
FIG. 2 is a mimetic cross-sectional view illustrating an additional configuration of a camera module according to an exemplary embodiment of the present invention.

FIG. 1 is a mimetic cross-sectional view illustrating configuration of a camera module according to an exemplary embodiment of the present invention, and FIG. 2 is a mimetic cross-sectional view illustrating an additional configuration of a camera module according to an exemplary embodiment of the present invention.

First of all, the camera module according to the exemplary embodiment of the present invention includes 5 pieces of lenses, where a first lens (10) is moved during auto focusing by being positioned at an actuator (200), and second to fifth lenses (20, 30, 40, 50) are mounted at a lens barrel (210).

Thus, the first lens (10) is moved during the auto focusing operation of the camera module to change the distance (d) between the first and second lenses (10, 20) as shown in FIG. 1. Furthermore, as illustrated in FIG. 2, the camera module according to an exemplary embodiment of the present invention may further include a holder fixing the lens barrel (210).

The camera module and the imaging lens are such that the actuator (200) is applied with an electric power to linearly move the first lens upwards or downwards, and a distance (d) between the first and second lenses (10, 20) is changed to adjust a focus, whereby a high-resolution and compact imaging lens system can be realized by moving one piece of lens, i.e., the first lens (10), out of five pieces of imaging lenses.

Operation of the actuator (200) and arrangement of constituent parts may be freely designed, such that it should be apparent to the skilled in the art that the operation and arrangement are not limited to the drawings and explanation of the present invention.

Figure 3:
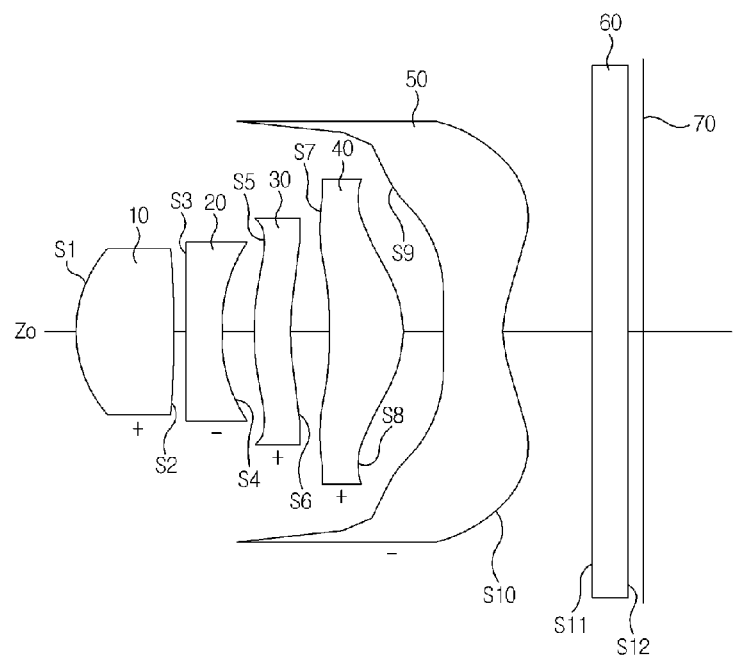
FIG. 3 is a schematic conceptual view illustrating an imaging lens of a camera module according to an exemplary embodiment of the present invention.

FIG. 3 is a schematic conceptual view illustrating an imaging lens of a camera module according to an exemplary embodiment of the present invention.

The camera module according to an exemplary embodiment of the present invention includes an image lens including five pieces of lenses comprised of first to sixth lenses (10, 20, 30, 40, 50) about an optical axis (ZO), where thickness, size, and shape of a lens are rather overdrawn for description, and a spherical shape or an aspheric shape has been only presented as one embodiment, but obviously not limited to this shape.

Referring to FIG. 3, the camera lens module according to an exemplary embodiment of the present invention has a layout construction with a first lens (10), a second lens (20), a third lens (30), a fourth lens (40), a fifth lens (50), a filter (60), and a photo-detector (70), in an ordered way from an object side.

Light corresponding to image information of a subject passes the first lens (10), the second lens (20), the third lens (30), the fourth lens (40), the fifth lens (50), and the filter (60), and is incident on the photo detector (70). The first lens (10), the second lens (20), the third lens (30), the fourth lens (40) and the fifth lens are the imaging lens of the present invention, and the present invention is formed with an aperture at the object side surface of the first lens (10), whereby aberration can be corrected and a clear image can be realized simultaneously to advantageously reduce a flare.

Hereinafter, in the description of the construction of each lens, "object side surface" means the surface of a lens facing an object side with respect to an optical axis, "image side surface" means the surface of the lens facing an imaging surface with respect to the optical axis, and upper side surface" means the surface of the lens a capturing surface with respect to an optical axis.

In the specification, "imaging" basically may refer to the process in which an imaging lens receives light from a subject in the field and outputs an image (image signal and image data) indicating the same. However, if the imaging lens is repeatedly generating the image indicating the subject in the field at a predetermined cycle, "imaging" may mean the process of storing a specific image out of the images generated by the imaging lens in a storage unit. In other words, from a certain standpoint, "imaging" may mean a process in which the imaging lens acquires an image indicating the content of the subject in the field and having the same in a state subjectable to the measurement process at a certain intended timing.

The first lens (10) has positive (+) refractive power and takes a convex form at an object side surface (S1). The second lens (20) has negative (−) refractive power and takes a concave form at an upper side surface (S4). The third lens (30) and fourth lens (40) have positive (+) refractive power and the fifth lens having negative (−) refractive power. As illustrated in FIG. 3, the third lens (30) takes a meniscus form convexly formed at an object side surface (S5). The fourth lens (40) takes a meniscus form.

The first, second, third, fourth and fifth lenses (10, 20, 30, 40, 50) have aspherical surface at one surface or both surfaces. All front surfaces of the second lens (20) have inflection points, and all surfaces of the third, fourth and fifth lenses (30, 40, 50) have one or more inflection points.

For information, 'S2' of FIG. 1 is an upper side surface of the first lens (10), 'S3' is an object side surface of the second lens (20), 'S5' and 'S6' are respectively an object side surface and an upper side surface of the third lens (30), 'S7' and 'S8' are respectively an object side surface and an upper side surface of the fourth lens (40), and 'S9' and 'S10' are respectively an object side surface and an upper side surface of the fifth lens (50).

Furthermore, one or more lenses of the first to fifth lenses (10, 20, 30, 40, 50) may be formed with aspheric shape. The filter (60) may be any one optical filter selected from an infrared filter and a cover glass. The filter (60), if applied with the infrared filter, blocks radiant heat emitted from external light from being transferred to the photo-detector (70). Furthermore, the infrared filter transmits visible light and reflects infrared rays to output it to the outside.

The photo-detector (70) is an image sensor, for example, CCD (Charge Coupled Device) or CMOS (Complementary Metal Oxide Semiconductor), etc.

The first lens (10), the second lens (20), the third lens (30), the fourth lens (40) and the fifth lens (50) respectively use an aspheric lens as later—described in the exemplary embodiments, to possibly improve resolution of a lens and have a good point of superior aberration property.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

| | |
|---|---|
| $0.5 < f1/fz1,\ f1/fz2,\ f1/fz3 < 1.5$ | [Conditional expression 1] |
| $0.1 < d1 < 0.4$ | [Conditional expression 2] |
| $1.15 < d3 < 0.54$ | [Conditional expression 3] |
| $4.7 < \Sigma T < 5.9,\ 0.5 < \Sigma T/fz1,\ \Sigma T/fz2,\ \Sigma T/fz3 <$ | [Conditional expression 4] |
| $1.6 < N2, N3 < 1.7$ | [Conditional expression 5] |
| $1.5 < N1, N4, N5 < 1.6$ | [Conditional expression 6] |
| $20 < V2, V3 < 30$ | [Conditional expression 7] |
| $50 < V1, V4, V5 < 60$ | [Conditional expression 8] |
| $2.0 < F/\# < 3.0,$ | [Conditional expression 9] | where, fz1, fz2, fz3: focus distances of imaging lens at zoom positions 1, 2 and 3, f1, f2, f3, f4, f5: focus distances of first to fifth lenses, d1: an air clearance between a first lens center and a second lens center at a zoom position 1 (infinity), d3: an air clearance between the first lens center and the second lens center at a zoom position 3 (10 cm), ΣT: a distance from object side surface of the first lens to an image-forming surface N1, N2, N3, N4, N5: refractive indexes of first to fifth lenses V1, V2, V3, V4, V5: Abbe's numbers of first to fifth lenses F/#: F-Number Conditional expression 1 specifies refractive power of the first lens (10), The first lens (10) has refractive power having an appropriate compensation of spherical aberration and appropriate chromatic aberration according to the conditional expression 1. The conditional expression 4 specifies dimension of optical axis direction of the entire optical system, and it is a condition for ultra-small lens and a condition for appropriate aberration compensation.

Conditional expressions 5 and 6 specify refractive indexes of the first to fifth lenses, conditional expressions 7 and 9 specify Abbe's number of the first to fifth lenses. The specification of Abbe's number of each lens is a condition for better compensation of chromatic aberration.

Hereinafter, the action and effect of the present invention will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes $10^1$, and E-02 denotes $10^{-2}$.

$$Z = \frac{cY^2}{1 + \sqrt{1-(1+K)c^2Y^2}} + AY^4 + BY^4 + CY^4 + EY^4 + FY^4 + \ldots$$ ⟨Equation 1⟩ where, z: distance from the lens's top-point to an optical axis direction, c: basic curvature of a lens, Y: distance towards a direction perpendicular to an optical axis, K: conic constant, and A, B, C, D, E, F: aspheric coefficients.

[Exemplary Embodiments]

The following Table 1 shows an exemplary embodiment matching the aforementioned conditional expressions.

TABLE 1

|  | Exemplary embodiments |
|---|---|
| fz1(Tele) | 4.0045 |
| fz2(Middle) | 3.9879 |
| fz3(Wide) | 3.9041 |
| f1 | 2.91 |
| f2 | −3.84 |
| f3 | 13.59 |
| f4 | 3.40 |
| f5 | −2.76 |
| f1/fz1 | 0.727 |
| f1/fz2 | 0.730 |
| f1/fz3 | 0.745 |
| d1 | 0.1 |
| d3 | 0.18 |
| ΣT | 4.8 |
| ΣT/fz1 | 1.199 |
| ΣT/fz2 | 1.204 |
| ΣT/fz3 | 1.229 |
| N1 | 1.53 |
| V1 | 56.5 |
| N2 | 1.63 |
| V2 | 23.9 |
| N3 | 1.63 |
| V3 | 23.9 |
| N4 | 1.53 |
| V4 | 56.5 |
| N5 | 1.53 |
| V5 | 56.5 |

Referring to Table 1, it can be noted that f1/fz1 is 0.726 that matches the conditional expression 1, and ΣT/fz1 is 1.198 that matches the conditional expression 4.

The following Table 2 shows an exemplary embodiment which is a more detailed exemplary embodiment over that of Table 1.

TABLE 2

| Surface number | Curvature radius (R) | Thickness or distance (d) | Refractive index (N) | Materials |
|---|---|---|---|---|
| Stop* | 1.71 | 0.83 | 1.53 | Plastic(P) |
| 2* | −13.74 | 0.10.0.11.0.18 |  |  |
| 3* | −60.31 | 0.31 | 1.63 | Plastic(P) |
| 4* | 2.58 | 0.26 |  |  |
| 5* | 2.71 | 0.32 | 1.63 | Plastic(P) |
| 6* | 3.76 | 0.32 |  |  |
| 7* | −4.46 | 0.63 | 1.53 | Plastic(P) |
| 8* | −1.35 | 0.33 |  |  |
| 9* | 5.80 | 0.50 | 1.53 | Plastic(P) |
| 10* | 1.12 | 0.76 |  |  |
| 11 | Infinity | 0.3 | 1.53 | IR-filter |
| 12 | Infinity | 0.14.0.15.0.16 |  |  |
| image | Infinity | 0.00-0.01-0.02 |  |  |

The notation * in the above Table 2 and following Table 3, which is further written near the surface number indicates aspheric. The following Table 3 shows a value of aspheric coefficient of each lens in the exemplary embodiment of Table 2.

TABLE 3

| Surface number | k | A | B | C | D | E |
|---|---|---|---|---|---|---|
| 1* | −0.7482 | 0.0150 | −0.0021 | −0.0078 | 0.0198 | −0.0159 |
| 2* | 0.0000 | 0.0050 | −0.0207 | 0.0558 | −0.0441 | −0.0024 |
| 3* | 0.0000 | −0.0250 | 0.0871 | −0.0942 | 0.0912 | −0.0447 |
| 4* | −21.3296 | 0.0670 | 0.0219 | −0.0047 | −0.0108 | 0.0150 |
| 5* | 0.0000 | −0.1539 | 0.0633 | −0.0251 | 0.0199 | −0.0133 |
| 6* | 0.0000 | −0.0689 | −0.0265 | 0.0347 | −0.0069 | −0.0006 |
| 7* | −25.1416 | 0.0480 | −0.0204 | −0.0123 | 0.0156 | −0.0037 |
| 8* | −0.8758 | 0.1065 | −0.0113 | 0.0016 | 0.0019 | −0.0006 |
| 9* | −473.3930 | −0.2013 | 0.1136 | −0.0469 | 0.0113 | −0.0010 |
| 10* | −7.1883 | −0.0945 | 0.0375 | −0.0113 | 0.0018 | −0.0001 |

Mode for the Invention

Figure 4B:
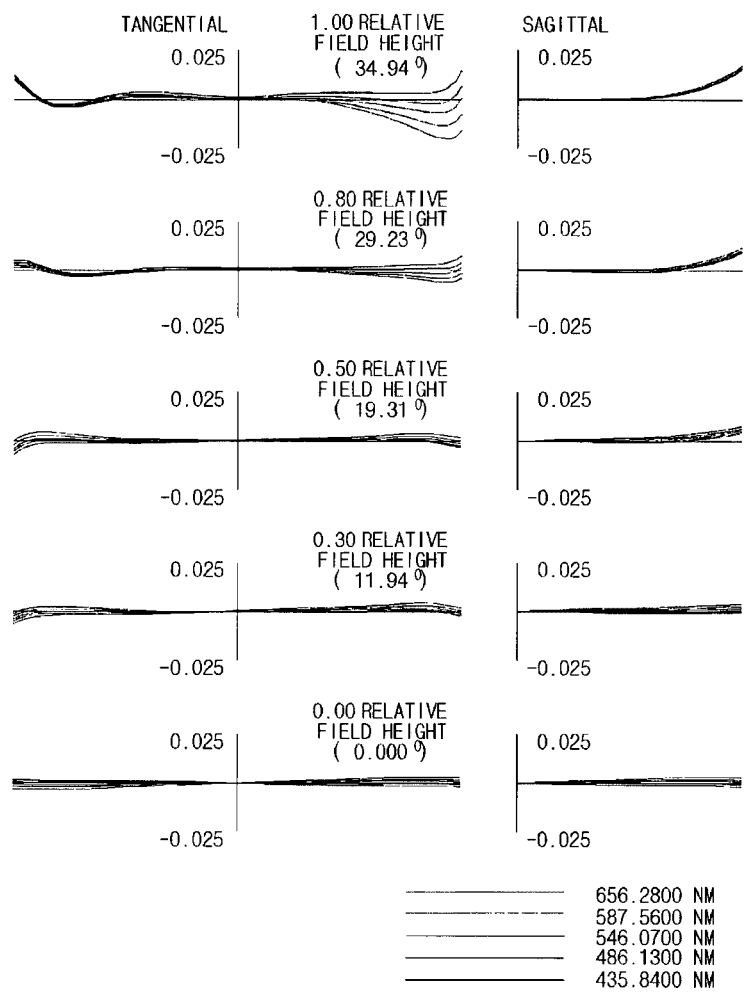
Figure 4C:
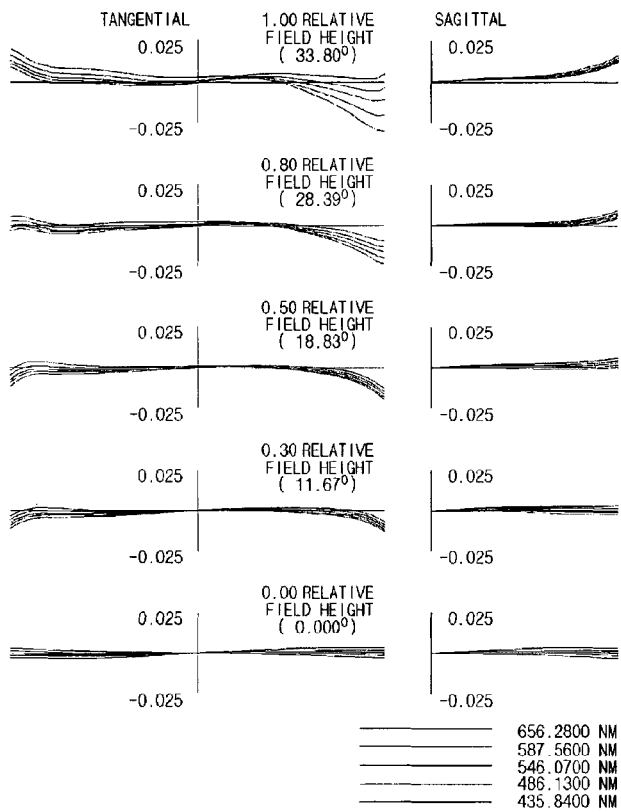

FIGS. 4a, 4b and 4c are graphs measuring coma aberrations at first, second and third zoom positions according to an exemplary embodiment of the present invention, where, FIG. 4a illustrates a coma aberration at the first zoom position (distance to subject is infinity), FIG. 4b illustrates a coma aberration at the second zoom position (distance to subject is 60 cm), and FIG. 4c illustrates a coma aberration at the third zoom position (distance to subject is 10 cm).

It is interpreted that a coma aberration correcting function is good as curves approach the X axis from a positive axis and a negative axis. As illustrated in measurement values of FIGS. 4a, 4b and 4c, In the shown aberration diagram, because values of images in nearly all fields appear proximate to the X axis, it is interpreted that coma aberration correcting functions all demonstrate a superior figure.

The first, second and third zoom positions are formed by the first, second and third lenses being moved during auto focusing, and it should be apparent to the skilled in the art that, although a total of three zoom positions are exemplified in the present exemplary embodiments, the number of zoom positions are not limited thereto, and any number of zoom positions may be exemplified.

Figure 5A:
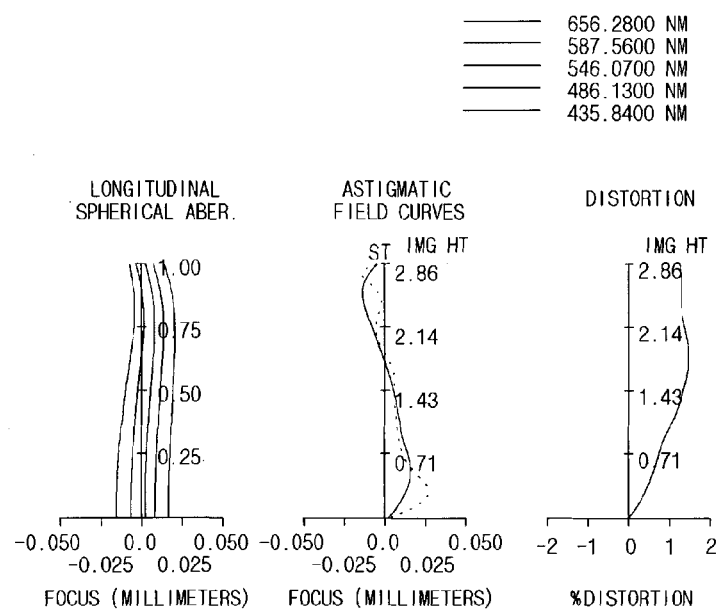
FIGS. 5a, 5b and 5c are graphs illustrating measured aberrations at first, second and third zoom positions according to an exemplary embodiment of the present invention.
Figure 5B:
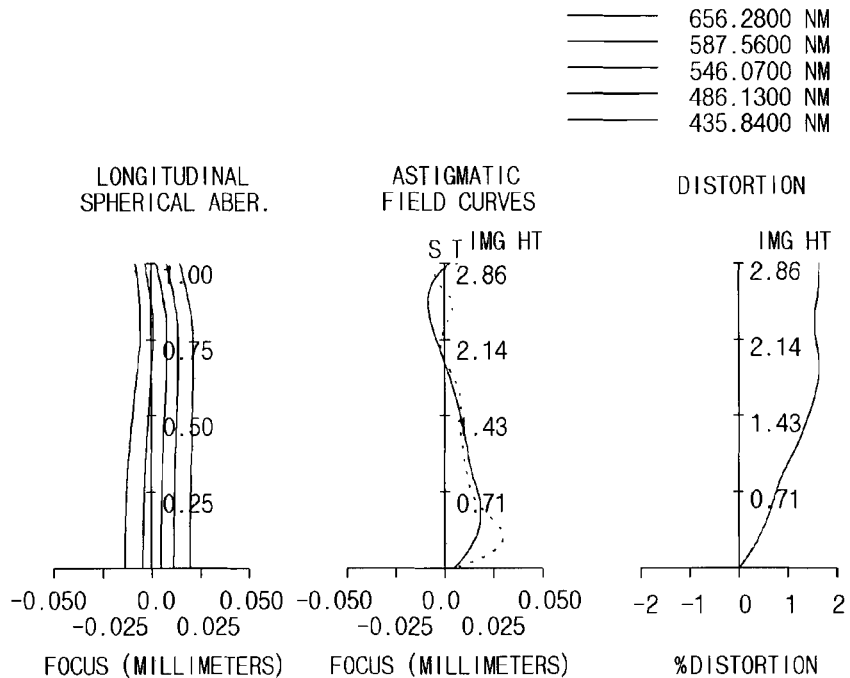
Figure 5C:
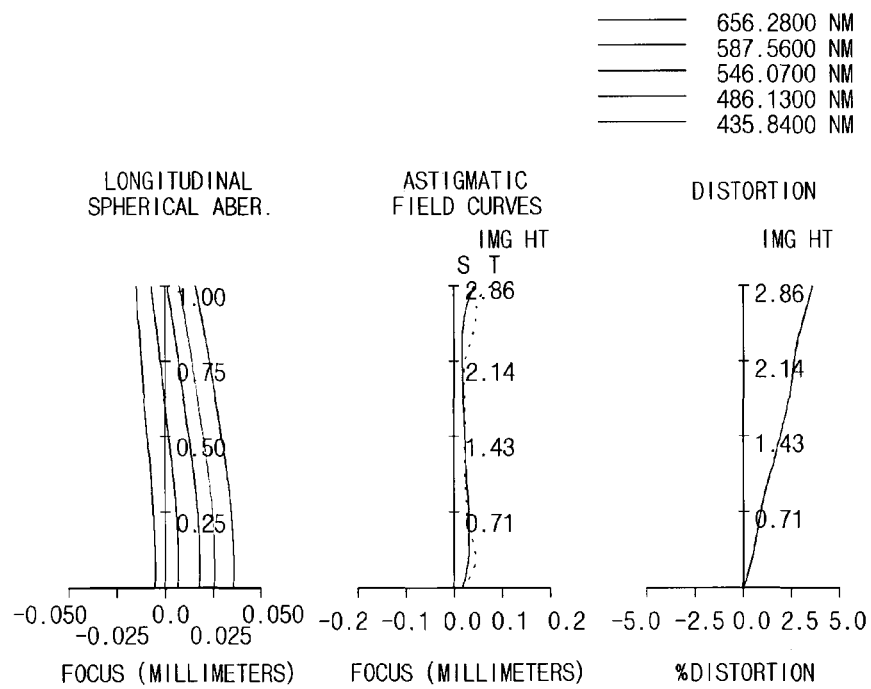

FIGS. 5a, 5b and 5c are graphs measuring aberrations at first, second and third zoom positions according to an exemplary embodiment of the present invention. That is, FIGS. 5a, 5b and 5c are graphs measuring longitudinal spherical aberration, astigmatic field curves and distortion in order from left side. In FIGS. 5a, 5b and 5c, a Y axis means size of an image, and an X axis means focal distance (unit: mm) and distortion degree (unit: %). In FIGS. 5a, 5b and 5c, it is interpreted that an aberration correcting function is good as curves approach the Y axis. In the shown aberration diagram, because values of images in nearly all fields appear proximate to the Y axis, longitudinal spherical aberration, astigmatic field curves and distortion all demonstrate a superior figure.

Figure 6A:
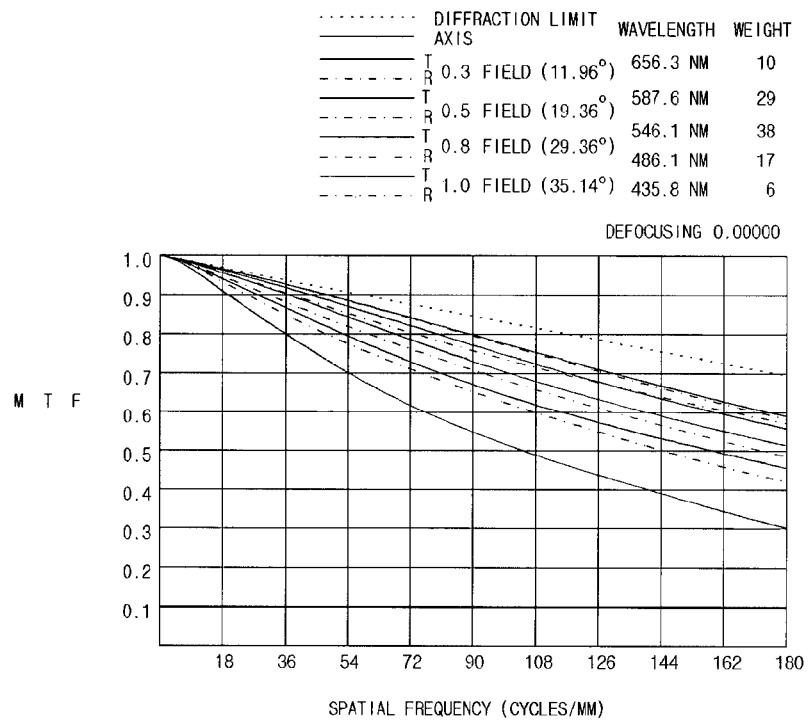
FIGS. 6a, 6b and 6c are graphs illustrating MTF (Modulation Transfer Function) characteristics of spatial frequency at first, second and third zoom positions according to an exemplary embodiment of the present invention.
Figure 6B:
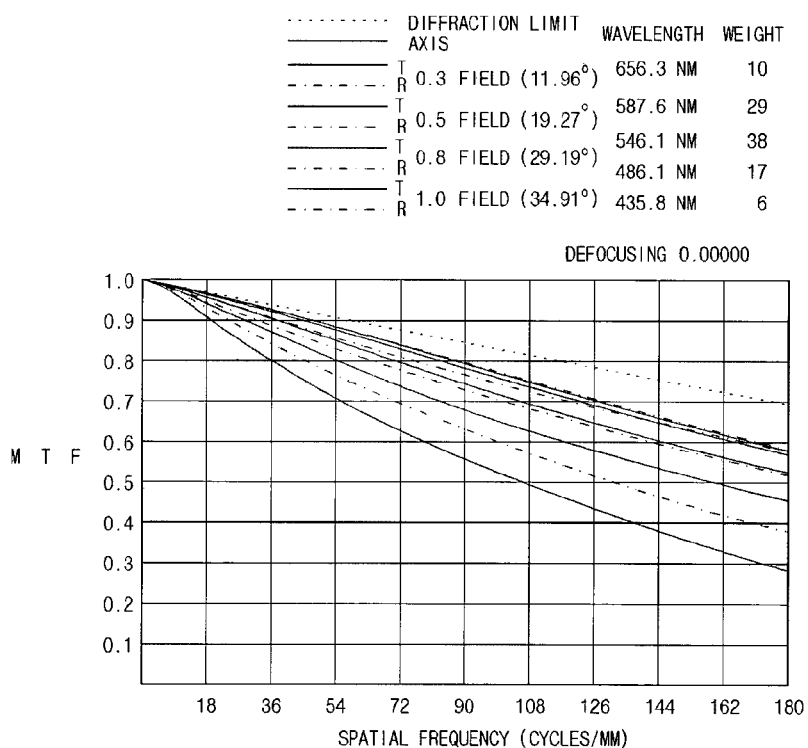
Figure 6C:
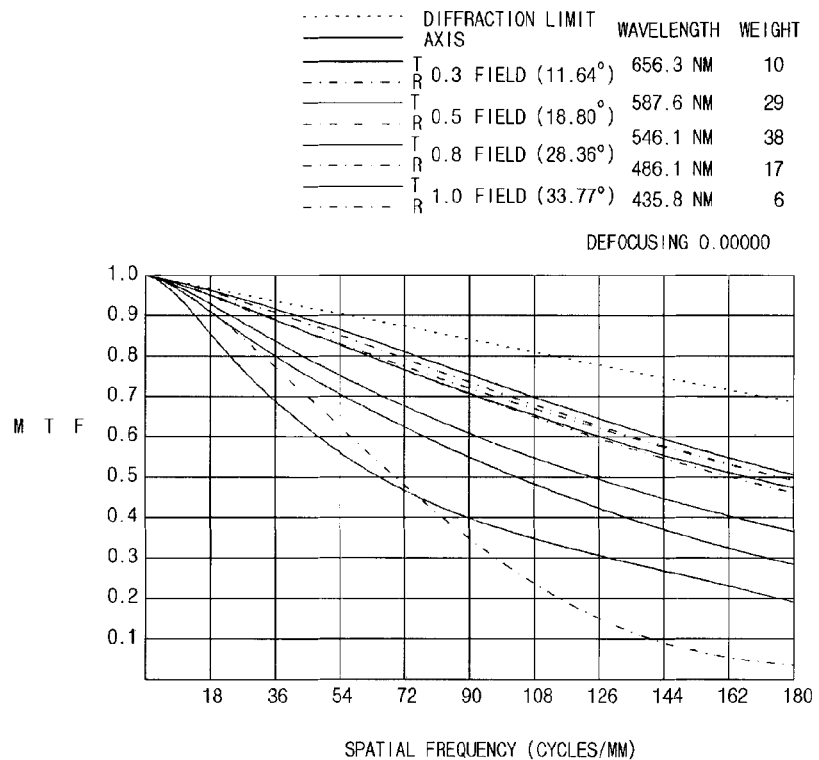

FIGS. 6a, 6b and 6c are graphs illustrating MTF (Modulation Transfer Function) characteristics of spatial frequency at first, second and third zoom positions according to an exemplary embodiment of the present invention, where the MTF characteristics depending on changes in spatial frequency (cycle/mm) of cycle per millimeter were measured.

At this time, the MTF characteristic is defined by a ratio calculated by a difference between light and an image of the light focused after passing a lens started from a surface of an original subject. Generally speaking, the image sharpness (resolution) is most ideal when an MTF value is '1', and as the MTF value decreases, the image sharpness decreases. That is, generally speaking, as the MTF value increases, the image sharpness increases.

Referring to FIGS. 6a, 6b and 6c, as the MTF values at the first, second and third zoom positions increase, it is interpreted that the imaging lens according to the exemplary embodiments is excellent in optical performances.

Figure 7A:
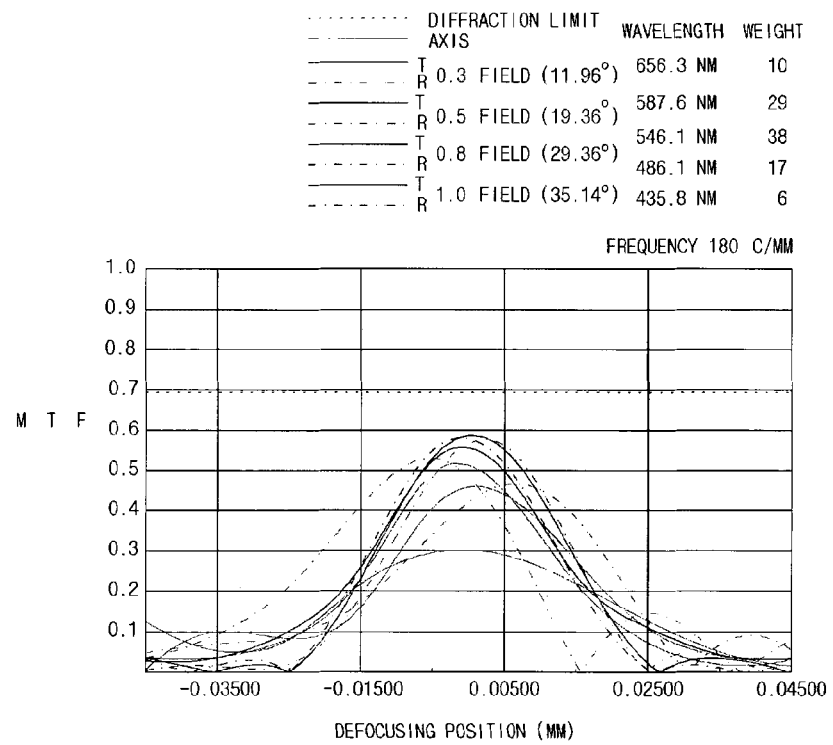
FIGS. 7a, 7b and 7c are graphs illustrating MTF (Modulation Transfer Function) characteristics of defocusing position at first, second and third zoom positions according to an exemplary embodiment of the present invention.
Figure 7B:
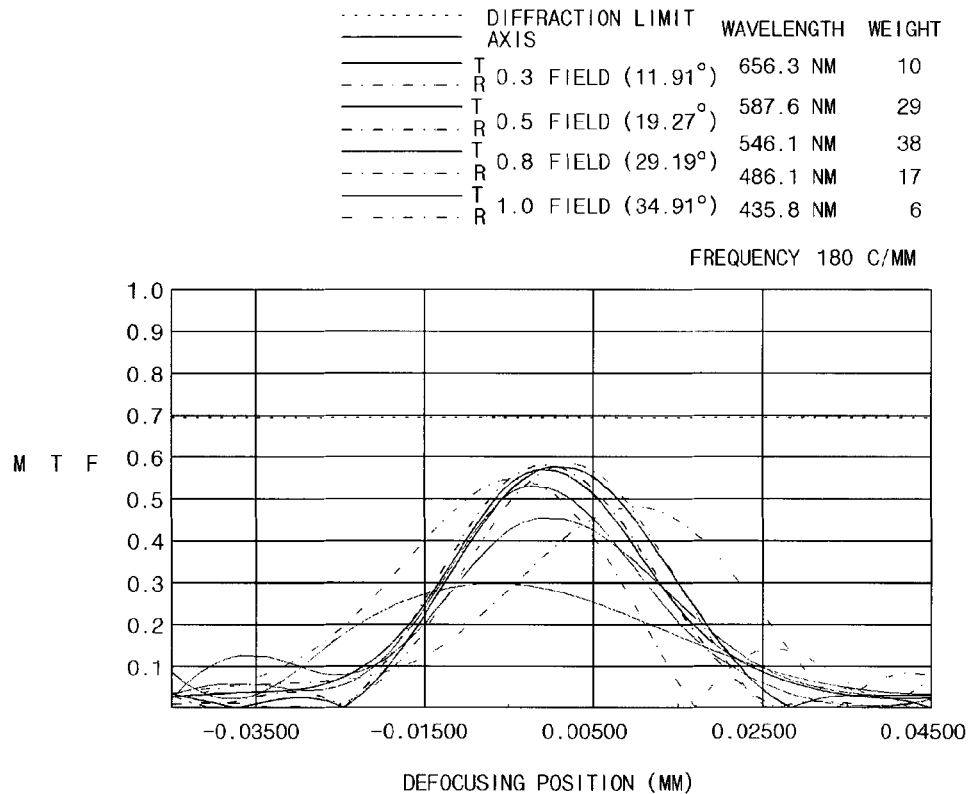
Figure 7C:
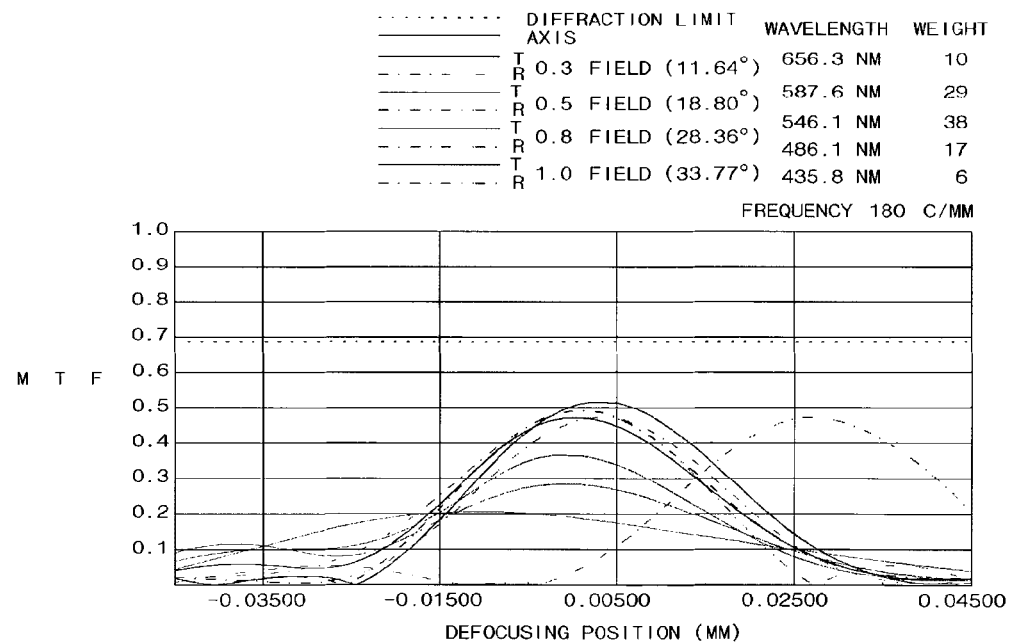

FIGS. 7a, 7b and 7c are graphs illustrating MTF (Modulation Transfer Function) characteristics of defocusing position at first, second and third zoom positions according to an exemplary embodiment of the present invention, where the graphs show a calculated through-focus MTF at a spatial frequency of 180 cycles/mm.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

Industrial Applicability

As apparent from the foregoing, the imaging lens and camera module according to the exemplary embodiments of the present invention has an industrial applicability in that a compact and high-resolution imaging lens system can be configured by moving one piece, i.e., a first lens, out of five imaging lenses.

The invention claimed is:

1. An imaging lens, the imaging lens comprising in an ordered way from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein the fifth lens has a convex form at an object side surface thereof at an optical axis of the imaging lens,
   wherein a conditional expression of $4.7<\Sigma T<5.9$, $0.5<\Sigma T/fz1$, $\Sigma T/fz2$, $\Sigma T/fz3<1.5$ is satisfied, where a distance from an object side surface of the first lens to an image-forming surface is $\Sigma T$;
   where focus distances of the imaging lens are respectively fz1, fz2, and fz3 at zoom positions 1, 2, and 3; and
   wherein a distance to object is infinity at the zoom position 1, a distance to object is 60 cm at the zoom position 2, and a distance to object is 10 cm at the zoom position 3.

2. The imaging lens of claim 1, wherein conditional expressions of $1.6<N2,N3<1.7$, and $1.5<N1,N4,N5<1.6$ are satisfied, where refractive indexes of the first, second, third, fourth and fifth lenses are respectively N1, N2, N3, N4 and N5.

3. The imaging lens of claim 1, wherein a conditional expression of $2.0<F/\#<3.0$ is satisfied, where the f number is F/#.

4. The imaging lens of claim 1, wherein the first lens takes a convex form at an object side surface.

5. The imaging lens of claim 1, wherein the second lens takes a concave form at an upper side surface.

6. The imaging lens of claim 1, wherein the third lens takes a meniscus form convexly formed at an object side surface.

7. The imaging lens of claim 1, wherein the fourth lens takes a meniscus form.

8. The imaging lens of claim 1, wherein all surfaces of the third, fourth and fifth lenses have at least one or more inflection points.

9. A camera module, the camera module comprising in an ordered way from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein the fifth lens has a convex form at an object side surface thereof at an optical axis of the imaging lens,
   wherein a conditional expression of $4.7<\Sigma T<5.9$, $0.5<\Sigma T/fz1$, $\Sigma T/fz2$, $\Sigma T/fz3<1.5$ is satisfied, where a distance from an object side surface of the first lens to an image-forming surface is $\Sigma T$;
   where focus distances of the imaging lens are respectively fz1, fz2, and fz3 at zoom positions 1, 2, and 3; and
   wherein a distance to object is infinity at the zoom position 1, a distance to object is 60 cm at the zoom position 2, and a distance to object is 10 cm at the zoom position 3.

10. The camera module of claim 9, wherein conditional expressions of $20<V2,V3<30$, and $50<V1,V4,V5<60$ are satisfied, where Abbe's numbers of first, second, third, fourth and fifth lenses are V1, V2, V3, V4 and V5.

11. The camera module of claim 9, wherein a conditional expression of $2.0<F/\#<3.0$ is satisfied, where the f number is F/#.

12. The camera module of claim 9, wherein the first lens takes a convex form at an object side surface.

13. The imaging lens of claim 1, wherein the first lens is movable.

14. The imaging lens of claim 13, wherein a conditional expression of $0.1<d1<0.4$ is satisfied, where d1 is an air clearance between a first lens center and a second lens center at a zoom position 1.

15. The imaging lens of claim 13, wherein a conditional expression of $0.5<f1/fz1$, $f1/fz2$, $f1/fz3<1.5$ is satisfied, where focus distances of imaging lenses are respectively fz1, fz2 and fz3, and a focus distance of the first lens is f1 at zoom positions 1, 2, and 3.

16. The imaging lens of claim 1, wherein, in a case Abbe's numbers of first, second, third, fourth, and fifth lenses are respectively V1, V2, V3, V4, and V5, conditional expressions of $20<V2,V3<30$ and $50<V1, V4, V5<60$ are met.

17. The camera module of claim 16, further comprising a holder fixing the lens barrel.

18. The camera module of claim 16, wherein a conditional expression of $0.1<d1<0.4$ is satisfied, where d1 is an air clearance between a first lens center and a second lens center at a zoom position 1.

19. The camera module of claim 16, wherein a conditional expression of $0.5<f1/fz1$, $f1/fz2$, $f1/fz3<1.5$ is satisfied, where focus distances of imaging lenses are respectively fz1, fz2 and fz3, and a focus distance of the first lens is f1 at zoom positions 1, 2, and 3.

20. The camera module of claim 9, further comprising:
an actuator disposed over the first lens, wherein the first lens is moved during auto focusing; and
a lens barrel including the second lens, the third lens, the fourth lens, and the fifth lens.

21. The imaging lens of claim 1, wherein the first lens takes a convex form at an image side surface, and
wherein the second lens takes a concave form at an object side surface.

22. The camera module of claim 9, wherein the first lens takes a convex form at an image side surface, and
wherein the second lens takes a concave form at an object side surface.

* * * * *